United States Patent
Koberg et al.

(10) Patent No.: US 9,363,347 B2
(45) Date of Patent: Jun. 7, 2016

(54) TEMPORALLY LIMITED MOBILE DEVICE CONTACT INFORMATION

(71) Applicant: QUALCOMM Incorporated, San Diego, CA (US)

(72) Inventors: Anu Koberg, San Diego, CA (US); Courtney L. Koberg, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/518,818

(22) Filed: Oct. 20, 2014

(65) Prior Publication Data
US 2015/0038126 A1   Feb. 5, 2015

Related U.S. Application Data

(60) Continuation of application No. 13/670,165, filed on Nov. 6, 2012, now Pat. No. 8,868,049, which is a division of application No. 12/328,905, filed on Dec. 5, 2008, now Pat. No. 8,311,580.

(51) Int. Cl.
*H04M 1/27* (2006.01)
*H04M 1/2745* (2006.01)

(52) U.S. Cl.
CPC ................ *H04M 1/274583* (2013.01)

(58) Field of Classification Search
None
See application file for complete search history.

(56) References Cited

U.S. PATENT DOCUMENTS

| | | |
|---|---|---|
| 6,295,355 B1 | 9/2001 | O'Neal et al. |
| 7,580,363 B2 | 8/2009 | Sorvari et al. |
| 8,311,580 B2 | 11/2012 | Koberg et al. |
| 2006/0178918 A1 | 8/2006 | Mikurak |
| 2006/0246874 A1 | 11/2006 | Sullivan |
| 2008/0177758 A1 | 7/2008 | Eldering |
| 2009/0156186 A1 | 6/2009 | Lyle |

(Continued)

FOREIGN PATENT DOCUMENTS

| EP | 1152586 A2 | 11/2001 |
|---|---|---|
| EP | 1860863 A1 | 11/2007 |

(Continued)

OTHER PUBLICATIONS

International Preliminary Report on Patentability—PCT/US2009/065907—The International Bureau of WIPO—Geneva, Switzerland, Mar. 17, 2011.

(Continued)

*Primary Examiner* — Diane Mizrahi
(74) *Attorney, Agent, or Firm* — Shirin Tefagh

(57) ABSTRACT

Archiving mobile device contact information as a function of occurrence of one or more temporal conditions is provided herein. By way of example, contact information stored in an active contact list of a mobile device can be associated with a temporal condition, such as frequency of use, or location of the mobile device, or the like. If the temporal condition is met, the contact information is archived at remote data store and/or passive portion of mobile device memory. Once the temporal condition is no longer met, the contact information can be re-downloaded into active memory and incorporated into the active contact list. As a result, aspects of the claimed subject matter provide for organizing a mobile device contact list according to temporal condition(s) to provide added efficiency and to manage such information according to a determinable situational context.

26 Claims, 10 Drawing Sheets

(56) References Cited

U.S. PATENT DOCUMENTS

| | | | |
|---|---|---|---|
| 2010/0250497 A1 | 9/2010 | Redlich et al. | |
| 2011/0035401 A1* | 2/2011 | Nye | H04L 63/104 707/769 |
| 2011/0289433 A1 | 11/2011 | Whalin et al. | |
| 2013/0065565 A1 | 3/2013 | Koberg et al. | |
| 2013/0263227 A1* | 10/2013 | Gongaware | H04L 63/08 726/4 |
| 2013/0318347 A1* | 11/2013 | Moffat | H04L 63/08 713/168 |

FOREIGN PATENT DOCUMENTS

| | | |
|---|---|---|
| GB | 2364481 | 1/2002 |
| JP | 5219174 | 8/1993 |
| JP | 2000125350 A | 4/2000 |
| JP | 2000324226 A | 11/2000 |
| JP | 2003273999 A | 9/2003 |
| JP | 2005136923 A | 5/2005 |
| JP | 2006101123 A | 4/2006 |
| JP | 2008022433 A | 1/2008 |
| JP | 2008047226 A | 2/2008 |
| JP | 2008510406 A | 4/2008 |
| JP | 2008252275 A | 10/2008 |
| WO | 0059186 A1 | 10/2000 |
| WO | 2006018724 A1 | 2/2006 |
| WO | 2006115048 A1 | 11/2006 |

OTHER PUBLICATIONS

International Search Report & Written Opinion—PCT/US2009/065907, International Search Authority—European Patent Office—Apr. 7, 2010.

* cited by examiner

TEMPORALLY LIMITED MOBILE DEVICE CONTACT INFORMATION

CLAIM OF PRIORITY UNDER 35 U.S.C. §120

The present application for patent is a Continuation of patent application Ser. No. 13/670,165, entitled "TEMPORALLY LIMITED MOBILE DEVICE CONTACT INFORMATION," filed Nov. 6, 2012, which is a Divisional of patent application Ser. No. 12/328,905, entitled "TEMPORALLY LIMITED MOBILE DEVICE CONTACT INFORMATION," filed Dec. 5, 2008, which are assigned to the assignee hereof and are hereby expressly incorporated by reference herein in their entirety.

BACKGROUND

The following description relates generally to electronically organizing contact information, and more particularly to automatically archiving and/or retrieving contact information at a mobile device based on a temporal condition.

In recent years, a variety of advancements has occurred in cellular communication technology and cellular communication devices. Some of the advancements, such as integration of personal organization applications into such devices including message history, phone and address books, and the like, incorporation of e-mail and short messaging services into mobile communication, and so on, involve software and/or hardware applications. These applications have added increased flexibility, processing power, communication capabilities, and so forth, to already popular communication devices (e.g., cellular telephones, etc.). As a result, such devices have become more pervasive in the consumer market, motivating larger numbers of consumers to purchase such devices, or to upgrade to devices that include new applications and technologies.

In addition to the foregoing, rapid advancements in communication network architectures have occurred in recent years as well. As computer processing power has become increasingly parallel, and memory has become larger in terms of storage space and smaller in terms of physical size, communication networks have been able to support mobile device functionality to a larger degree. For instance, some mobile applications, such as ring tone downloading services, involve applications of remote services providers that are integrated with the mobile device by way of the communication network. Part of the application is executed at the client device (e.g., mobile phone) while another part is executed at a remote server. For such an architecture, the mobile communication networks serve as an interface to an application that runs both at the mobile device and at the remote server. Many other similar examples of remote mobile applications can exist. One modern trend for mobile communication technology is to integrate services across remote platforms to leverage the power and flexibility available from remote computing platforms.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Providing for archiving mobile device contact information as a function of occurrence of one or more temporal conditions is disclosed herein. Mobile devices, being transitory in nature, are often associated with a dynamic environmental context. Particularly, location and other temporal (e.g., time varying, etc.) conditions of such devices are often changing. The claimed subject matter provides for archiving and/or retrieving contact information (e.g., phone numbers, address, etc.) upon occurrence of a specified or default temporal condition. For instance, a user can store a phone number of a taxi company in a contact list of their mobile device while on a weeklong business trip in New York. A temporal condition, such as 1-week duration, or 10-mile proximity with New York, and so forth, can be associated with the taxi company phone number. Once the temporal condition is no longer met (e.g., 1 week expires, mobile device location leaves the 10-mile proximity, etc.), the phone number can be archived and/or removed from the user's contact list on the mobile device. As a result, aspects of the claimed subject matter provide for organizing a mobile device contact list according to temporal condition to reduce clutter, efficiently use memory, and maintain only contact information pertinent to a user's concurrent context (e.g., location, contact use history or use frequency, and so on).

According to other aspects, the claimed subject matter provides for retrieving archived contact information as a result of a temporal condition. For instance, to continue the previous example, if a device user returns to New York after the weeklong business trip, contact information associated with proximity to New York (e.g., including the phone number of the taxi company) can be downloaded back into active memory of the mobile device and included within the contact list. Further, the mobile device can provide notification of such downloading, to serve as a reminder for the user of the phone number of the taxi company. Thus, the user's contacts that are pertinent to New York can be re-introduced into the contact list for convenience. Furthermore, per the user's selection, the contacts can auto expire or be deleted from memory altogether. Such expiration/deletion can occur as a result of expiration of a predetermined time, travel outside of a predetermined geographic location, access/use of the contact falling below a threshold access frequency and/or access time, or a like situational context of a user and/or of the contact information, or a combination thereof. Accordingly, aspects of the claimed subject matter provide for managing mobile device contact information according to situational context of a user.

According to additional aspects, disclosed is a method of temporally limiting contact information stored within a mobile communication device. The method can include receiving contact information of an entity at a mobile device and storing the contact information in a contact list at the mobile device. Furthermore, the method can include receiving or generating a temporal condition for maintaining the contact information in the contact list and removing the contact information from the contact list based at least in part upon occurrence of the temporal condition.

Further aspects include an apparatus that provides temporary storage of contact information for a mobile device. The apparatus can include an interface that receives contact information at a mobile device. Additionally, the apparatus can include memory that stores the contact information and at least a contact management module that is configured to receive or generate a temporal condition for retaining the contact information within the memory. The memory can also include an archive module that is configured to remove the contact information from the memory based at least in part upon occurrence of the temporal condition. Moreover, the apparatus can include a processor that executes at least the contact management module to associate the temporal condition with the contact information, or determine occurrence of the temporal condition, or remove the contact information from the memory, or a combination thereof.

According to other aspects, disclosed is at least one processor configured to provide temporally limited contact information for a mobile device. The processor(s) can include a first module for receiving contact information of an entity at a mobile device and a second module for storing the contact information in a contact list at the mobile device. In addition, the processor(s) can include a third module for receiving or generating a temporal condition for maintaining the contact information in the contact list as well as a fourth module for removing the contact information from the contact list based at least in part upon occurrence of the temporal condition.

Moreover, some aspects of the claimed subject matter provide for an apparatus that provides temporally limited contact information for a mobile device. The apparatus can include means for receiving contact information of an entity at a mobile device and means for storing the contact information in a contact list at the mobile device. Furthermore, the apparatus can include means for receiving or generating a temporal condition for maintaining the contact information in the contact list and means for removing the contact information from the contact list based at least in part upon occurrence of the temporal condition.

According to one or more other aspects, disclosed is a computer program product comprising a computer-readable medium containing instructions for providing temporally limited contact information for a mobile device. More particularly, the instructions can include at least one instruction for receiving contact information of an entity at a mobile device and at least one instruction for storing the contact information in a contact list at the mobile device. Additionally, the instructions can include at least one instruction for receiving or generating a temporal condition for maintaining the contact information in the contact list and at least one instruction for removing the contact information from the contact list based at least in part upon occurrence of the temporal condition.

Aspects of the claimed subject matter also provide for a method of interfacing with and supporting a mobile device having temporally limited contact information. The method can include communicatively coupling a mobile network component with a mobile device. The method can also include receiving contact information of an entity from the mobile device upon occurrence of a temporal condition that results in removal of the contact information from active memory on the mobile device.

According to still other aspects, disclosed is an apparatus that supports, from a mobile network, temporally limited mobile device contact information. The apparatus can include a transceiver communicatively coupled with a mobile device via a wireless link and memory configured to store contact information received from the mobile device via the transceiver and the wireless link upon occurrence of a temporal archive condition. Moreover, the apparatus can include a processor that executes an archive module stored in the memory, the archive module is configured to determine information related to the temporal archive condition or manage the contact information based at least in part on a contemporaneous state of the temporal archive condition, or both.

In addition to the foregoing, disclosed is at least one processor configured to interface with and support a mobile device having temporally limited contact information. The processor(s) can include a first module for communicatively coupling a mobile network component with a mobile device. Further, the processor(s) can include a second module for receiving contact information of an entity from the mobile device upon occurrence of a temporal condition that results in removal of the contact information from active memory on the mobile device.

According to still other aspects, provided is an apparatus that can interface with and support a mobile device having temporally limited contact information. Particularly, the apparatus can include means for communicatively coupling a mobile network component with a mobile device. Further, the apparatus can include means for receiving contact information of an entity from the mobile device upon occurrence of a temporal condition that results in removal of the contact information from active memory on the mobile device.

Additional aspects of the claimed subject matter provide for a computer program product comprising a computer-readable medium containing instructions for interfacing with and supporting a mobile device having temporally limited contact information. The instructions can further include at least one instruction for communicatively coupling a mobile network component with a mobile device. Additionally, the instructions can also include at least one instruction for receiving contact information of an entity from the mobile device upon occurrence of a temporal condition that results in removal of the contact information from active memory on the mobile device.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
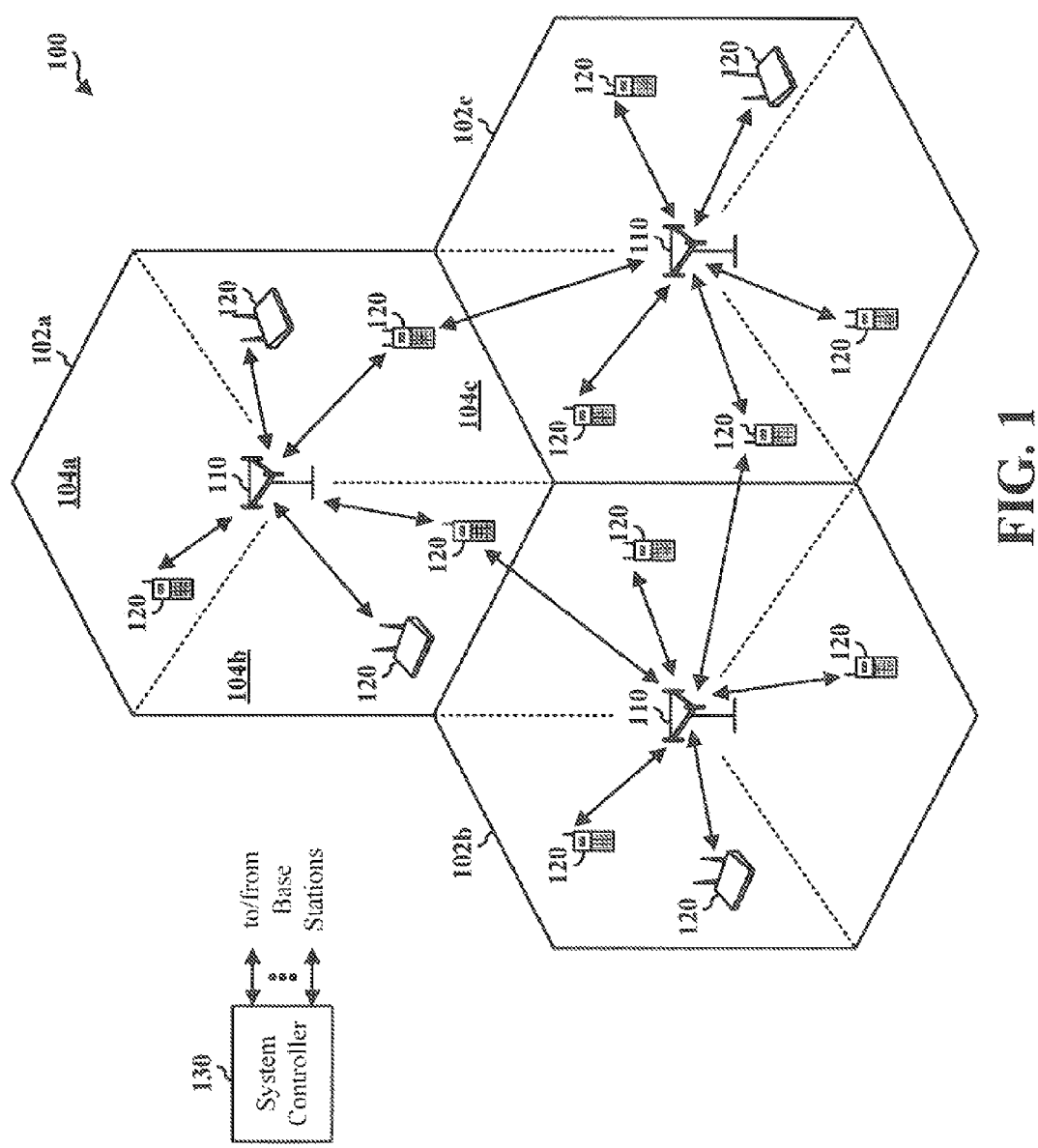
FIG. 1 illustrates a block diagram of a sample system for wireless communication between mobile devices and one or more base stations, according to one aspect.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

The subject disclosure provides for archiving and/or retrieving contact information of a mobile device according to a temporal condition. Contact management applications offer diverse functionality and can be incorporated into a mobile communication device, such as a cellular telephone, mobile phone, multi-mode phone, personal digital assistant (PDA), and so forth. Such applications can store phone number(s) (e.g., cell phone, home phone, business phone, fax phone, pager number, miscellaneous numbers, etc.), physical address(es) (e.g., business address, home address, mailing address, etc.), e-mail address(es) (e.g., work, personal, etc.), name, title, photograph(s), notes, or the like, for contact entities. Such entities can include, for instance, a person, a business, a corporation, organization, or a combination thereof or of the like. Although such applications can be very useful for aggregating information pertinent to contacting an entity via one or more modes of communication, vast amounts of such information can clutter a mobile device contact application, becoming inefficient and intimidating for some device users.

Although contact applications (e.g., an address book, contact list, etc.) for mobile devices can be very useful for storing communication information, large amounts of information can slow down access to desired contacts. For instance, mobile devices are often preferred for personal organization (e.g., calendar applications, contact applications, meeting and task scheduling applications, and so on) because of their small size, portability, and ease with which they can be carried on one's person. In addition, as mobile devices incorporate modern processing capabilities and modem applications, desired features available only on larger, stationary or semi-stationary devices (e.g., desktop computers) can be incorporated into the mobile devices. Furthermore, contact list applications are highly suited to mobile devices, as such devices can incorporate a vast number of communication mechanisms, such as local, national and even international voice calling, e-mail, short message service (SMS), instant message (IM) service, text message service, and so on. Because a mobile device is a convenient personal communication device, it is well suited toward storing (and, e.g., accumulating) communication contact information. In addition to the foregoing, because the mobile device is also a voice communication device, users often desire to access contact information quickly for immediate communication use, rather than simply retrieving information from a stationary database for future use. Consequently, contact information management that incorporates a relative condition (e.g., location, frequency of use, period of inactivity, or the like) of the mobile device, device user, or the contact information, or a combination thereof, can provide additional efficiency and convenience for mobile devices.

According to one or more aspects, contact information stored in a contact list (e.g., a list of contact information or portion thereof stored in memory that is presented and/or displayed at the mobile device upon accessing the contact list, receiving a communication, initiating a communication, reviewing past communication(s) or messages, and so on) can be associated with a temporal condition. The temporal condition can include, for instance, geographic location of the mobile device (e.g., relative to an area code, city, region, etc., of the contact or phone number), access frequency of the contact information, or inactivity period of the contact information, or the like or a combination thereof. Further, the components can determine mobile device location, contact information access frequency and/or period of un-use, and archive the contact information when a specified or default condition has been met. According to additional aspects, if the temporal condition fails, for instance if the mobile device returns to a predetermined graphical region, or access frequency of the contact information (e.g., from the archive) or period of un-use rises above a threshold, the mobile device can indicate/display such condition and/or download the contact information from archive memory back to the contact list stored in active memory (e.g., included with displayed information).

According to further aspects, a mobile device network can facilitate and support temporal contacts at a mobile device. For instance, the mobile device network can receive archived contact information for remote storage once a temporal condition, limiting storage in active memory at the device, occurs. The device user can search the archive for archived contact information, which can be retrieved from the remote storage, and the archived information can be removed from a contact list of the mobile device. If, however, the temporal condition no longer applies, the network can notify the mobile device and/or send the contact information back to the mobile device to be re-entered into the contact list. Accordingly, the subject disclosure provides for archive support for mobile device contact information according to temporal condition (e.g., device location, access frequency, and so on) associated with the mobile device and/or the contact information.

Various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of one or more mobile applications operating on a mobile device and requesting access to and/or controlling a mobile device resource or mobile network resource. One skilled in the art should appreciate that similar techniques could apply to other communication environments as well.

As used in this disclosure, the terms "component," "system," and the like are intended to refer to a computer-related entity, either hardware, software, software in execution, firmware, middle ware, microcode, and/or any combination thereof. For example, a component can be, but is not limited to being, a process running on a processor, a processor, an object, an executable, a thread of execution, a program, and/or a computer. One or more components can reside within a process and/or thread of execution and a component can be localized on one computer and/or distributed between two or more computers. Further, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein can be rearranged and/or complemented by additional components in order to facilitate achieving the various aspects, goals, advantages, etc., described with regard thereto, and are not limited to the precise configurations set forth in a given figure, as will be appreciated by one skilled in the art.

Additionally, the various illustrative logics, logical blocks, modules, and circuits described in connection with the aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Additionally, at least one processor can comprise one or more modules operable to perform one or more of the steps and/or actions described herein.

Furthermore, various aspects are described herein in connection with a mobile communication device (or, e.g., a mobile device, etc.). A mobile communication device can also be called a system, a subscriber unit, a subscriber station, mobile station, mobile, mobile device, cellular device, multi-mode device, remote station, remote terminal, access terminal, user terminal, user agent, a user device, or user equipment, or the like. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps and/or actions of a method or algorithm can reside as at least one or any combination or set of codes and/or instructions on a machine readable medium and/or computer readable medium, which can be incorporated into a computer program product. Further, the term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

In addition to the foregoing, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, in this example, X could employ A, or X could employ B, or X could employ both A and B, and thus the statement "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of a system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, a block diagram of a system 100 is depicted for wireless communication between mobile devices and one or more base stations, according to one aspect. Specifically, FIG. 1 illustrates a wireless communication system 100 with multiple base stations 110 and multiple terminals 120, which can be utilized in conjunction with one or more aspects. A base station (110) is generally a fixed station that communicates with the terminals (120). The base station 110 can be referred to as an access point, a Node B, a base transceiver station, or some like terminology, for instance. Each base station 110 provides communication coverage for a particular geographic area, illustrated as three geographic areas, labeled 102a, 102b, and 102c. The term "cell" can refer to a base station and/or its coverage area depending on the context in which the term is used. To improve system capacity, a base station coverage area can be partitioned into multiple smaller areas (e.g., three smaller areas, according to cell 102a in FIG. 1), 104a, 104b, and 104c. Each smaller area can be served by a respective base transceiver subsystem (BTS). The term "sector" can refer to a BTS and/or its coverage area depending on the context in which the term is used. For a sectorized cell, the BTSs for all sectors of that cell are co-located within the base station for the cell. The transmission techniques described herein can be used for a system with sectorized cells as well as a system with un-sectorized cells. For simplicity, in the following description, the term "base station" is used generically for a fixed station that serves a sector as well as a fixed station that serves as a cell.

Terminals 120 are dispersed throughout the system 100, and each terminal can be fixed or mobile. A terminal can also be called a mobile station, user equipment, a user device, or some other terminology, as described above. A terminal can further be a wireless device, a cellular phone, a personal digital assistant (PDA), a wireless modem card, and so on. Each terminal 120 can communicate with zero, one, or multiple base stations on the downlink and uplink at any given moment. The downlink (or forward link) refers to the communication link from the base stations to the terminals, and the uplink (or reverse link) refers to the communication link from the terminals to the base stations. The wireless communication architecture depicted at FIG. 1 can serve as the transport mechanism for contact information between the terminal (120) and components of the mobile network (130), for archiving and/or retrieving such information from/to the terminal (120) (e.g., see FIG. 5, infra).

For a centralized architecture, a system controller 130 couples to base stations 110 and provides coordination and control for the base stations 110. For a distributed architecture, base stations 110 can communicate with one another as needed. Data transmission on the forward link occurs from one access point to one access terminal at or near the maximum data rate that can be supported by the forward link and/or the communication system. Additional channels of the forward link (e.g., control channel, etc.) can be transmitted from multiple access points to one access terminal. Reverse link data communication can occur from one access terminal to one or more access points.

System controller 130 can include logic for receiving and storing contact information from a terminal (120) as a result of a temporal condition. For instance, one or more base stations can be utilized to determine a contemporaneous location of the terminal(s) 120, at least in part based on a known location of the base station(s) 110 and, for instance, a wireless signal loss from the terminal 110 to the base station(s) 120. Terminal location information can be utilized to determine if a terminal 120 leaves a geographic region (102*a*, 104*a*). If the geographic region (102*a*, 104*a*) is associated with a contact phone number (e.g., an area code), the contact information can be removed from a contact list at the terminal and uploaded to the system controller (and, e.g., remote memory) for archiving. If the terminal(s) 120 returns to the geographic region (102*a*, 104*a*), the system controller 130 can notify the terminal(s) 120 and/or transmit the archived contact information to the terminal(s) 120. Consequently, at least a geographic location (102*a*, 104*a*) of a terminal 120 can be utilized to manage contact information, by associating such information with a particular region and determination a relationship between the terminal 120 and such region.

Figure 2:
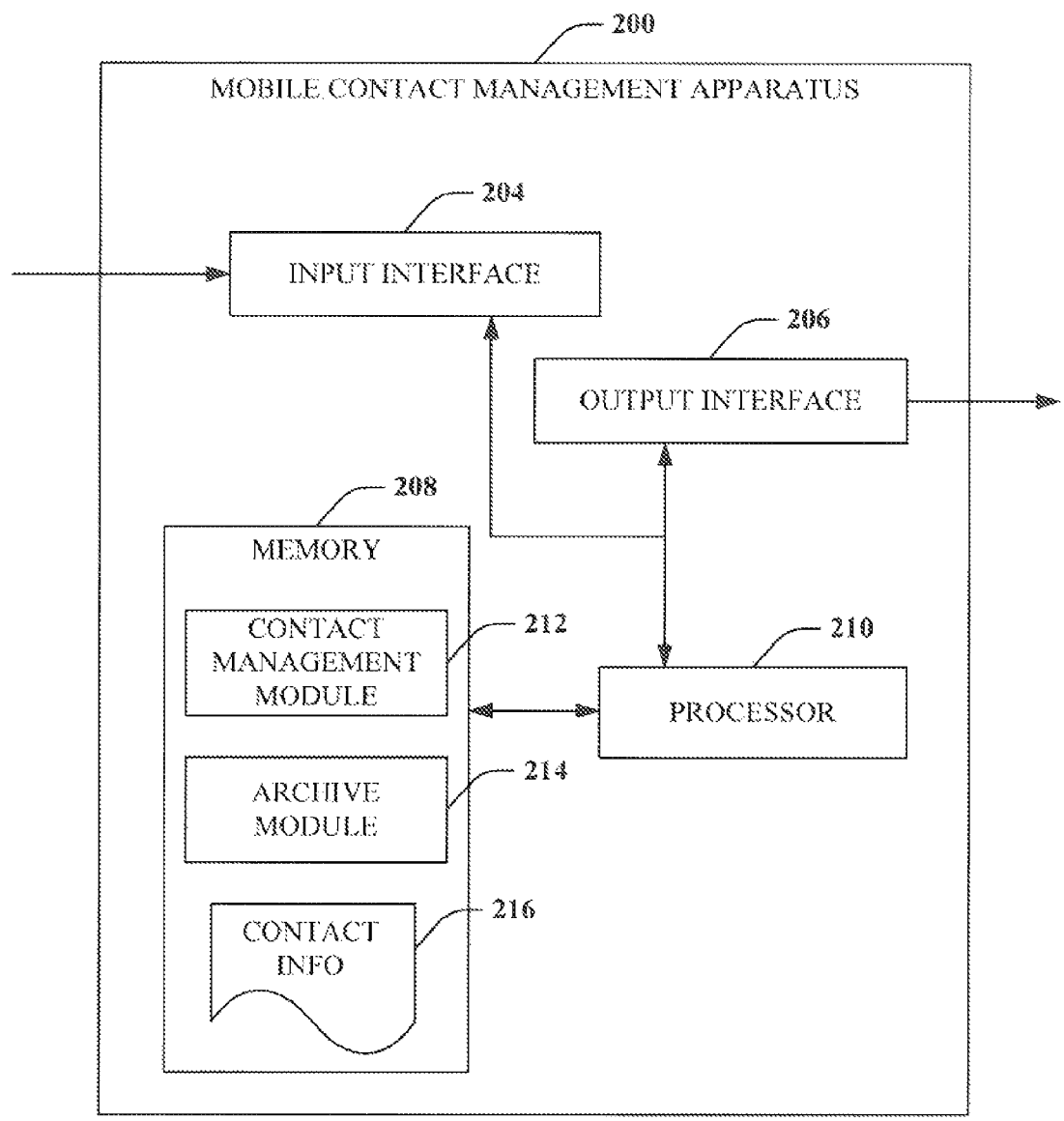
FIG. 2 depicts an example mobile contact management apparatus according to one or more aspects of the claimed subject matter.

FIG. 2 depicts an example mobile contact management apparatus 200 according to one or more aspects of the claimed subject matter. The mobile contact management apparatus 200 can receive contact information 216 of an entity at a mobile device, store the contact information 216 subject to a temporal condition (e.g., location of the mobile device, access frequency and/or access history of the contact information, and so on). The management apparatus 200 can maintain the contact information 216 in a contact list of the mobile device (e.g., part of an address book application and/or contact organizer) until occurrence of the temporal condition. Once the condition occurs, the contact information 216 can be archived and/or removed from the contact list and stored in archive memory. Additionally, once the temporal condition expires (or, e.g., a second temporal condition occurs) the contact information 216 can be re-loaded onto the mobile device and/or displayed to a user as a notification. Accordingly, contact information 216 can be managed and/or archived as a function of location of the device relative to a specified or predetermined location (e.g., area code of a phone number, proximity to a physical address, and so on) or access frequency/history of the contact information 216.

Mobile contact management apparatus 200 can include an input interface 204 and output interface 206 that can receive and send digital information, either through wired or wireless interface, or both. Specifically, input interface 204 can receive contact information 216 of an entity at a mobile device. The contact information 216 can include contact identity (e.g., name, title, position, membership information, etc.) and related phone number(s), physical address(es), e-mail address(es), photograph(s), SMS information, IM information, text message information, and so on. Such information (216) can be entered, for instance, by a user of the mobile device. Alternatively, the information (216) can be received/downloaded from a remote data store (not depicted), such as a personal computer, enterprise server, networked business server, or the like.

In addition to the foregoing, the input interface 204 can receive a temporal condition for maintaining the contact information 216 in a contact list. Such temporal condition can be entered by a user upon entering the contact information 216, for example. Particularly, if a user enters a phone number of a business or individual, the temporal condition can relate to an anticipated period of time in which the contact information will be needed. Alternatively, the temporal condition can be related to a frequency of use or period of inactivity (e.g., period of time in which the contact information is not accessed on the mobile device, referenced, or utilized, or the like). According to another example, the temporal condition can relate to proximity of the mobile device to a geographic area associated with the contact information, such as an area code associated with a phone number, a physical address or threshold proximity to the physical address, and so on. The received temporal condition can be provided to management and archive modules (212, 214) that can manage the contact information according to the condition(s).

Apparatus 200 can also include memory 208 that can store information (e.g., electronic, magnetic, and/or digital storage, or the like), including various program, logic and/or process modules (212, 214), and a processor 210 to execute such modules (212, 214). The memory 208 can further include a contact management module 212 that is configured to receive or to generate a temporal condition for retaining the contact information within memory. For instance, the contact management module 212 can receive contact information 216 from the input module 204 and incorporate the contact information 216 into a contact list, address book, or the like, of the mobile device.

In addition to the foregoing, the apparatus 200 can include an archive module 214 stored in memory 208 that is configured to remove the contact information from the memory based at least in part upon occurrence of the temporal condition. The archive module 214 can determine time, location or frequency information, or a combination thereof or of the like, associated with the temporal condition. For instance, mobile device location, determined from a global position system (GPS) or assisted GPS (A-GPS) mechanism or from a wireless interface with at least one mobile network base station, a period of time after receiving the contact information, a frequency of use of the contact information, or a period of inactivity of the contact information can be determined. If such determined information satisfies the temporal condition, archive module 214 can remove the contact information from the contact list, address book, etc. The information can be provided to the output interface 206 for transmission to a remote data store (e.g., see FIG. 5, infra) or to passive memory of the mobile device (e.g., portion of memory that is not displayed in an active contact list, or displayed separate from an active contact list, and so on). Accordingly, apparatus 200 can remove contact information upon expiration of a determined condition in order to prevent a contact list from becoming cluttered with information that is not relevant to a concurrent state of the mobile device or a user of such device.

As a particular, non-limiting example to provide an illustration of aspects of the subject disclosure, a device user plans a one week business trip to Orlando Fla. In preparing for the trip, the user enters a customer service phone number for an airline, car rental agency, and hotel which the user will be utilizing into the mobile device (e.g., received by input interface 204). The user knows that the trip will be one week long and thus enters a temporal condition of one week into the mobile device for the customer service phone numbers. As a result, upon expiration of one week, mobile contact management apparatus 200 can archive the customer service phone numbers (e.g., remove them from the contact list and store them in remote memory at a remote server, or a portion of memory on the mobile device that is not displayed as part of an active contact list, or the like).

It should be appreciated that more than one temporal condition can be associated with contact information 216 in accordance with one or more aspects of the subject disclosure. To continue the previous example, the mobile device user can specify a geographic location associated with the contact information, and specify that the contact information should be maintained in the contact list until expiration of one week, or until the mobile device leaves the geographic area, or both conditions occur. Such geographic location associated with the contact information can include a geographic area having a particular area code (e.g., 407 or 321 with respect to Orlando Fla.), a geographic area of a city, county, state/province, country, region, etc., or a physical address, or a threshold proximity (e.g., 10 mile area surrounding a specified region or address or the like) of any of the foregoing.

In addition, the temporal condition(s) can be monitored by mobile contact management apparatus 200 to determine whether an archive condition no longer applies. For instance, with respect to the foregoing example, if two temporal conditions are established for archiving the contact information 216, expiration of one week and location of the mobile device outside of Orlando Fla., the contact information can be archived as described herein upon occurrence of both conditions. If the mobile device subsequently returns to Orlando Fla., archive module 214 can determine that the temporal condition has failed. Upon such determination, the mobile device can be notified of the contact information 216 associated with the Orlando condition and/or the contact information 216 can be automatically loaded back into the contact list of the mobile device. Accordingly, a situational context of a user or device (e.g., including at least location) can be determined and utilized to archive and/or restore (e.g., to an active contact list or address book) contact information 216 at a mobile device.

Figure 3:
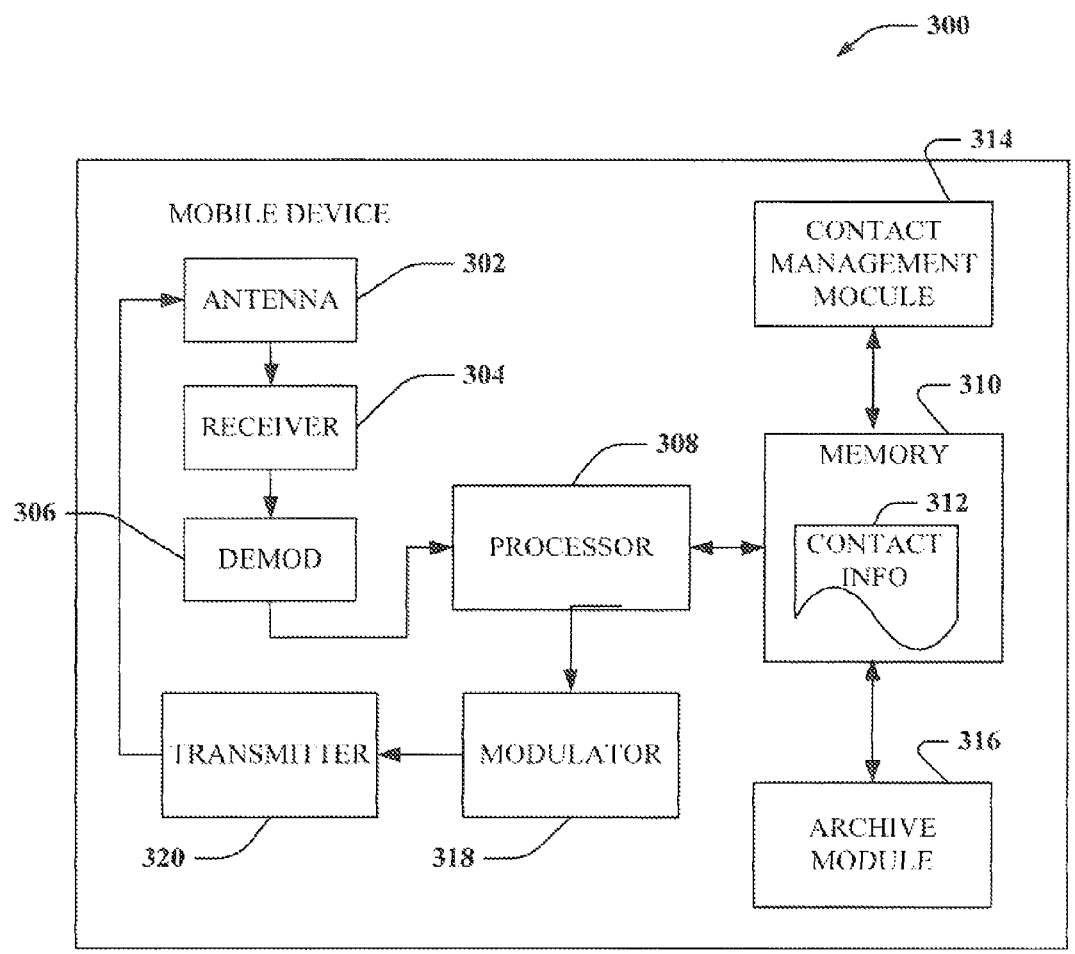
FIG. 3 illustrates an example mobile device that can manage and temporally limit contact information according to one or more aspects.

Referring to FIG. 3, an example system 300 is illustrated of a mobile device that can manage and temporally limit contact information according to one or more aspects. Mobile device 300 includes at least one antenna 302 (e.g., a transmission receiver or group of such receivers comprising an input interface) that receives a signal (e.g., pertaining to user contact information, a temporal condition associated with such information or with the mobile device) and a receiver 304, which performs actions (e.g., filters, amplifies, down-converts, etc.) on the received signal. Specifically, antenna 302 can receive a location of the mobile device (e.g., from a GPS-type satellite or server, from a mobile network base station, and so on), or access time or frequency information related to archived contact information (e.g., stored on a remote server) as described herein.

Antenna 302 and receiver 304 can also be coupled with a demodulator 306 that can demodulate received symbols and provide them to a processor 308 for evaluation. Processor 308 can analyze information received by antenna 902 or a user input interface of the mobile device (not depicted), and/or generate information for transmission by a transmitter 320. Additionally, processor 308 can control one or more components (306, 312, 314, 316, or 318) of the mobile device 300. Additionally, processor 308 can execute one or more modules, applications, or the like (314, 316) that manage contact information at a mobile device as a function of one or more temporal conditions associated with such contact information, as described herein. For instance, processor 308 can execute at least a contact management module 314 stored in memory 310 to associate the temporal condition(s) with the contact information. Alternatively, or in addition, the processor can execute the module 314 to determine occurrence of the temporal condition, or write/remove the contact information in/from memory, or a combination of the foregoing or of the like. In addition to the foregoing, the processor 308 can execute an archive module 316 to remove contact information 312 from memory 310 based at least in part on an occurrence of the temporal condition(s).

In addition to the foregoing, archive module 316 is configured to write the contact information 312 into a passive portion of memory 310. The passive portion of memory 310 can be a compressed portion of mobile device memory 310, or a portion not included in a contact list application, or not included with standard contacts of such an application, or the like. Alternatively, or in addition, the archive module 316 can remove (e.g., delete) the contact information 312 from memory 310 and relocate the contact information 312 at a remote data store (not depicted).

According to one or more aspects, the archive module 312 can be configured to condition removal of contact information 312 from memory 310 based on occurrence of a temporal condition, as discussed above, or receipt of user approval, or both. For instance, the archive module 312 can prompt a mobile device user (e.g., by way of a user input interface) for approval to archive the contact information. If such approval is received, the contact information can be removed from a contact list (or, e.g., from device memory 310 altogether) and stored in passive and/or remote memory. Optionally, the archive module 312 can receive and execute a request to remove and archive the contact information 312 even if the temporal condition has not occurred (e.g., overriding the temporal condition to remove the contact information prior to such condition occurring).

According to still other aspects, the archive module 312 can be configured to receive archived contact information if the temporal condition is no longer satisfied, or for instance, if occurrence of a second condition results. For instance, a second condition can be failure of the temporal condition. As a particular example, if a temporal condition specifies that contact information 312 should be archived if mobile device 300 leaves a geographic area, such condition can subsequently fail (or, e.g., a second condition can occur) if the mobile device re-enters the geographic area. Accordingly, contact information 312 associated with the geographic location can be uploaded back into mobile device memory 310 (e.g., in a contact list of a phone book application) from a passive portion of memory (310) and/or from a remote memory. As an alternative example, a temporal condition can specify that contact information 312 is to be archived and/or removed from an active contact list in memory 310 when an access frequency (e.g., a number of times the contact information is accessed, or used in communication, in a period of time) or a period of un-use (e.g., an amount of time in which the contact information is not accessed or is not used in communication) drops below a threshold value. If the access frequency and/or period of un-use rises above or drops below, respectively, the threshold value(s), the contact information can be re-inserted into the active contact list in memory 310 and/or a user can be prompted to approve such re-insertion.

Figure 4:
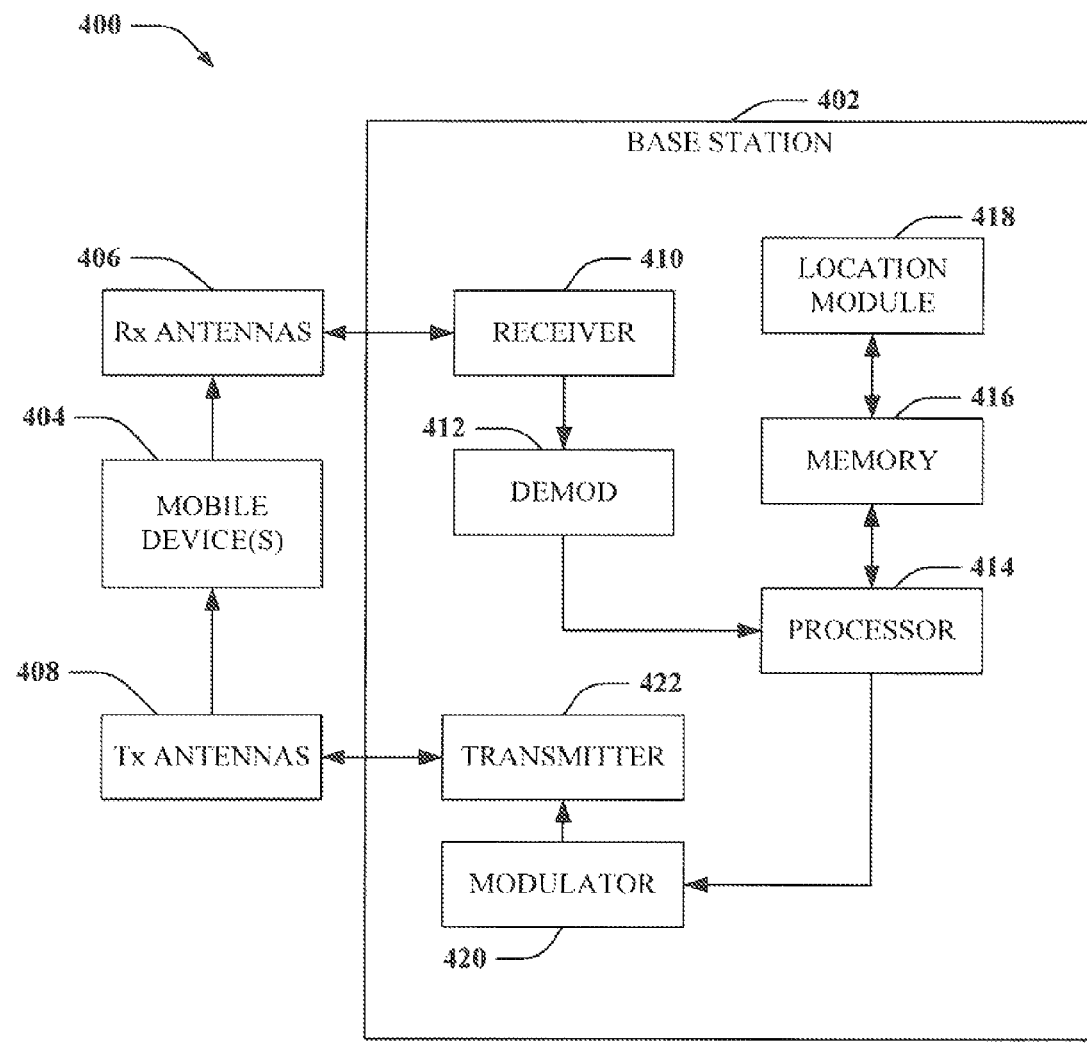
FIG. 4 illustrates an example base station that can support and interface with a mobile device according to particular aspects.

FIG. 4 illustrates an example system 400 including a base station 402 that can support and interface with a mobile device(s) 404 according to particular aspects. The base station 402 (e.g., access point, etc.) can further include an input interface 410 that receives signal(s) from one or more mobile devices 404 through a plurality of receive antennas 406, and a transmitter 422 that transmits to the one or more mobile devices 404 through a transmit antenna 408. The input interface 410 can receive information from receive antennas 406, such as information related to voice and/or data communication over a wireless link between the mobile device(s) 404 and receive antennas 406. Particularly, the communication can include data pertaining to temporally limited contact information, a temporal condition (e.g., location of mobile device(s) 404 and/or base station 402) or the like, as described herein. Additionally, input interface 410 is operatively associated with a demodulator 412 that demodulates received information. Processor 414 can analyze demodulated symbols provided by demodulator 412. In addition, processor 414 can be coupled to a memory 416 that stores information and/or application modules (418) associated with interfacing and/or supporting time limited contact information at a mobile device (404). For instance, the information and/or modules (418) can relate to determining location of the mobile device, receiving contact information removed from the mobile device(s) 404 upon occurrence of a temporal condition, forwarding such contact information to memory at a network server, re-sending the contact information to the mobile device(s) 404 upon failure of the temporal condition (or, e.g., occurrence of a second condition), and/or any other suitable information related to performing the various actions and functions set forth herein.

Memory 416 can include at least a location module 418 stored therein. The activation module 418 can establish control of a dedicated network resource for a mobile application. For instance, the location module 418 can determine a location of a mobile device(s) 404 sustaining a wireless link with the receive antennas 406. Particularly, by determining signal loss from the receive antennas 406 and mobile device(s) 404, distance between such antennas 406 and device(s) 404 can be approximated. A location of a base station 402 can be known (e.g., determined by a network provider during base station site planning), and thus location of the mobile device(s) 404 can also be known with uncertainty similar to the distance between antennas 406 and device(s) 404. Alternatively, location module 418 can further refine location of the mobile device(s) 404 by communicating with other base stations (not depicted, but see FIG. 1, supra) that can receive wireless data from the mobile device(s) 404 and utilizing a triangulation algorithm or the like. Mobile device location can be utilized to determine occurrence of a temporal condition. Base station 402 can notify mobile device(s) 404 of such occurrence by way of receive antennas 406. As a result, mobile device(s) 404 can upload contact information to base station 402 for archiving, or contact information can be provided from base station 402 to mobile device(s) 404 to facilitate retrieval of such information from an archive, as described by various aspects herein.

Figure 5:
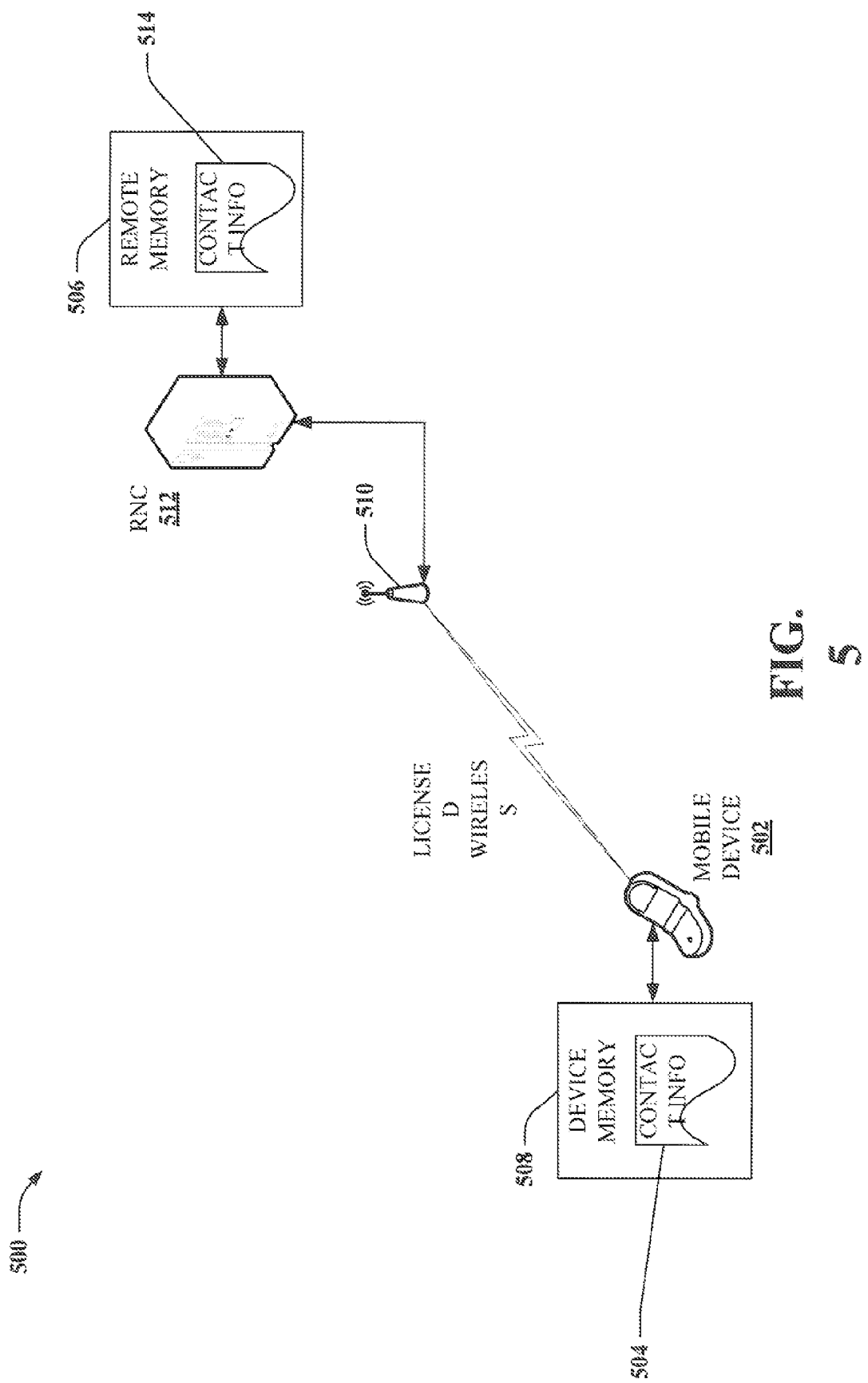
FIG. 5 depicts a sample system that can archive mobile device contact information at remote memory according to still other aspects.

FIG. 5 illustrates a sample system 500 that can archive mobile device (502) contact information (504, 514) at remote memory 506 according to still other aspects. A user can enter a temporal condition (e.g., storage time, access frequency, period of un-use, mobile device [502] location, etc.) and associate the condition with the contact information 504. Upon occurrence of the condition, the contact information can be uploaded to the remote memory 506 and deleted from mobile device memory 508 (or, e.g., included within a passive portion of such memory [508]). Further, if the condition subsequently fails (e.g., for location, access frequency, period of un-use, or like conditions), the contact information can be downloaded form remote memory 506 back to device memory 508, optionally by prompting a user of the device 502. Accordingly, system 500 provides for automated management of mobile device (502) contact information (504, 514) based on a context of the mobile device and/or frequency of use.

According to specific aspects, system 500 can include a base station 510 that facilitates remote communication between the mobile device 502 and components of a mobile network 512. In addition, the base station 510 can provide location information pertinent to the mobile device 502 (e.g., as described at FIG. 4, supra). The mobile device 502, base station 510, or network component 512 can utilize the location information in relation to a geographic temporal condition, for instance. Mobile network component 512 can be, for example, a radio network controller (RNC) or like device for routing, directing and/or translating mobile device communication. The mobile network component 512 can provide an interface to the remote memory 506 that resides on a mobile network, for instance. According to one or more aspects, the remote memory 506 can serve as storage for archived contact information.

As an example to illustrate aspects of the foregoing, a particular contact (504) can be entered into device memory 508 with the stipulation that such contact (504) is to be archived if frequency of use drops below once per month (or, e.g., below a default value stored within mobile device memory 508 and/or associated with a contact management application if no specified value is given). Components of mobile device 502 (e.g., archive module 316 and/or contact management module 314, depicted at FIG. 3, supra) can track access and/or usage of the contact information 504 to determine whether such condition occurs. If the condition occurs, contact information 504 can be uploaded to the remote memory 506 via base station 510 and mobile network component 512. The information is stored as archived contact information 514 at the remote memory 506. If a user of the device requests access to the archived contact information 514, such information can be transmitted to mobile device 502 (and, e.g., stored in temporary memory). If access to the archived contact information 514 rises above the once per month access frequency established as the temporal condition, the archived contact information 514 can be re-downloaded onto the mobile device (optionally at the discretion of the device user) and stored as contact information 504 in device memory 508.

It should be appreciated that numerous other temporal conditions can be associated with mobile device contact information 504. Such conditions, known in the art or made known to one of skill in the art by way of the context provided herein, are incorporated into the subject disclosure. Accordingly, system 500 provides for automatically archiving mobile device contact information 504 upon occurrence of a specified or default condition. Further, system 500 provides for automatically re-downloading the archived contact information 514 into mobile device memory 508 upon failure of the specified or default condition. As a result, automated management of contact information to reduce clutter and inefficiency of an active contact list is provided.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Referring to FIGS. 6-9, methodologies relating to managing and/or archiving temporally limited contact information at a mobile device are depicted. While, for purposes of simplicity of explanation, the methodologies are shown and described as a series of acts, it is to be understood and appreciated that the methodologies are not limited by the order of acts. For example, in accordance with one or more aspects, some acts can occur in different orders and/or concurrently with other acts from that shown and described herein. In addition, those skilled in the art will understand and appreciate that a methodology could alternatively be represented as a series of interrelated states or events, such as in a state diagram. Moreover, not all illustrated acts are necessarily required to implement a methodology in accordance with one or more aspects.

Figure 6:
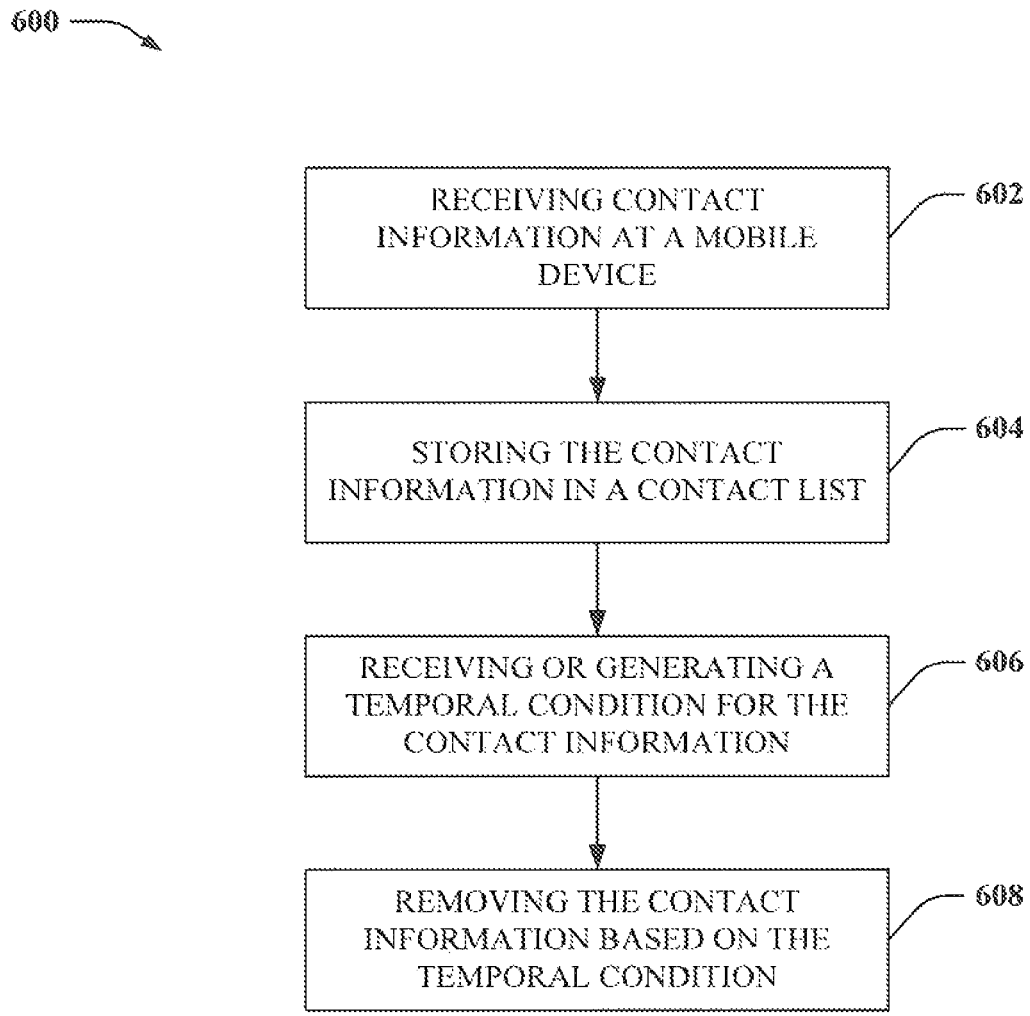
FIG. 6 illustrates an example methodology for providing temporally limited contact information according to one or more aspects of the subject disclosure.

Referring now to FIG. 6, a flowchart of a sample methodology 600 is depicted for providing temporally limited contact information according to aspects of the subject disclosure. Method 600, at 602, can receive contact information at a mobile device. The contact information can be related to any suitable entity, such as a person, business, corporation, organization, or a combination thereof or of the like. Further, the contact information can include identification information, phone number(s), physical address(es) and/or e-mail address(es), SMS information, IM information, text message information, photograph(s), and so on. The contact information can be received by a user entering such information into the mobile device, by downloading it from a remote device such as a personal computer, laptop or PDA, or by downloading from a remote server such as an Internet server, intranet server, and so forth.

At 604, the contact information can be stored in a contact list at the mobile device. The contact list can, for instance, be included within a portion of active memory on the mobile device. Specifically, the contact list (and, e.g., active memory) can be displayed whenever the contact list or a related address/task/calendar organizing application on the mobile device is accessed.

At 606, a temporal condition can be received or generated for the contact information. Such a temporal condition can include a geographic location of the mobile device with respect to a suitable location associated with the contact information (e.g., area code associated with a phone number, threshold radius associated with a concurrent location of the device, and so on, as described herein or known in the art). Alternatively, or in addition, the temporal condition can include a frequency of access/use associated with the contact information. Further, the temporal condition can include a period of inactivity and/or period of un-use. Any suitable temporal condition can be specified by a user and entered onto the mobile device, and associated with the contact information. Alternatively, a default temporal condition (e.g., including location, access frequency, period of non-use, etc.) can be stored within the mobile device and utilized in lieu of or in addition to a specified temporal condition. A default temporal condition can be generated by the device in accordance with determinable information associated with the mobile device and/or user related to contact information (e.g., average access frequency of contact information, average period of non-use, average degree of travel of the mobile device, or a suitable fraction of such quantities, or the like).

At 608, method 600 can remove the contact information from the contact list of the mobile device based at least in part upon occurrence of the temporal condition. For instance, if the mobile device moves out of a geographic region designated in the temporal condition, the contact information can be removed. Alternatively, or in addition, of access frequency or period of non-use rise above or fall below a threshold, as suitable, the information can be removed. As a result, method 600 can facilitate deletion, archiving, etc., of contact information when such information is not frequently used or no longer relevant to a contemporaneous context of the mobile device.

Figure 7:
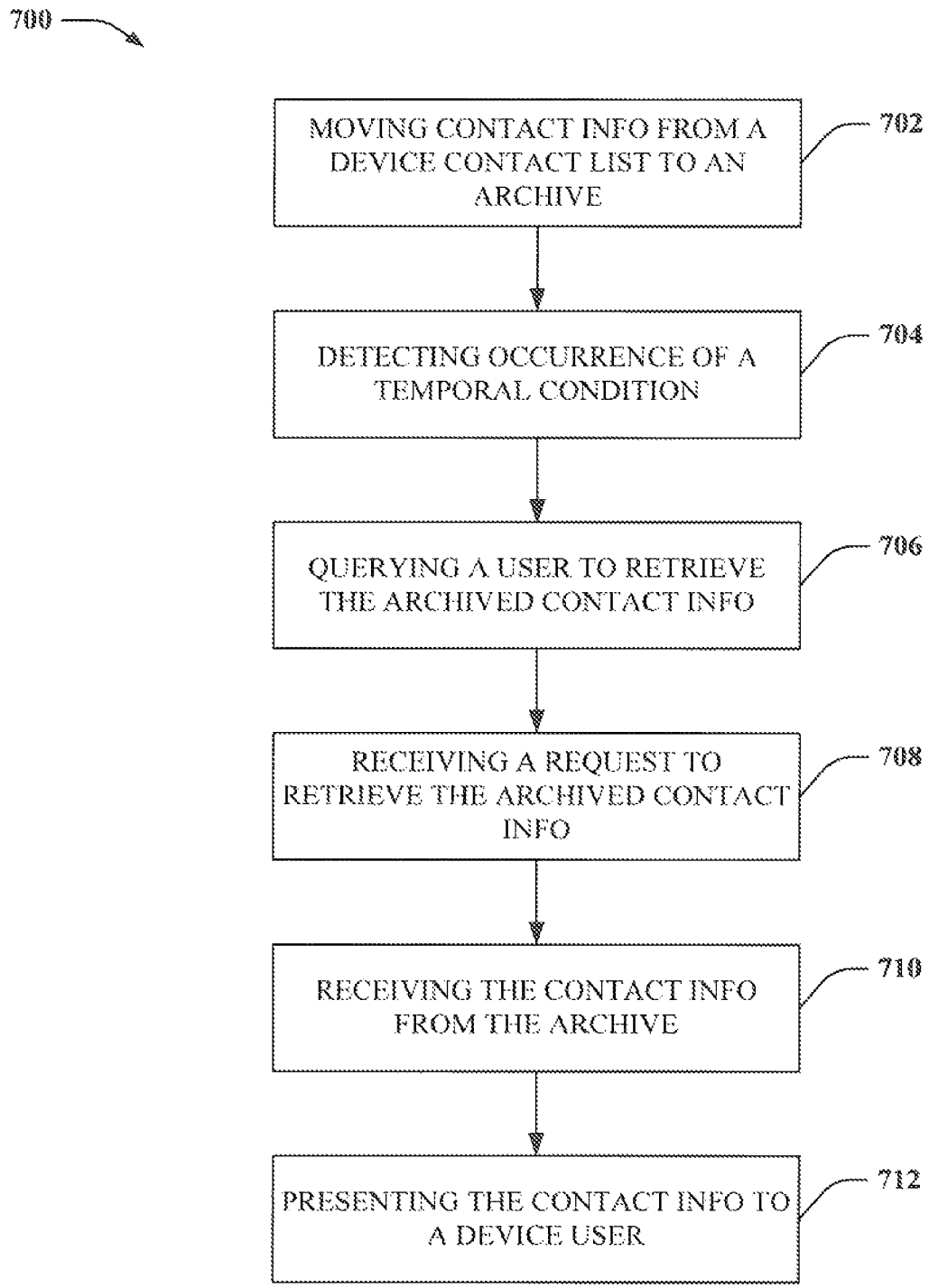
FIG. 7 depicts a sample methodology for managing mobile contact information according to one or more determined conditions, in accordance with one aspect.

FIG. 7 depicts a sample methodology 700 for managing mobile contact information according to one or more determined conditions. At 702, method 700 can move contact information from a mobile device to an archive. The contact information (e.g., as described herein) can be transmitted to the archive by way of a wired (e.g., Ethernet, communication bus structure, and so on) or wireless (e.g., cellular network and/or base station, 802.11x radio frequency transmitter, Bluetooth transmission, microwave frequency transmission, optical frequency transmission, or a combination thereof or of the like) interface. The archive can be passive memory of the mobile device. Such passive memory can include, for instance, compressed memory that is not displayed as part of an address book or contact list, or like user interface application, provided by a contact management application on the mobile device. The archive can also include remote memory at a remote computer, database, network server, and so on (e.g., see FIG. 5, supra).

At 704, method 700 can detect an occurrence of a temporal condition. The temporal condition can be access frequency or period of use of the contact information, or geographic location of the mobile device in relation to a location pertinent to the contact information, or the like or combination thereof, as described herein or known in the art. Occurrence of the condition can be detected by a timer on the mobile device or remote storage device, for instance. Alternatively, or in addition, occurrence of the condition can be determined by a location determination device associated with the mobile device (e.g., cellular network base station[s], GPS or A-GPS device, and so on). Such device can compare location of the mobile device with the location pertinent to the contact information (e.g., area associated with an area code of a phone number, a physical address and radius or region surrounding such address up to a threshold distance, a city, county, and so on). The temporal condition can be established by a user of the device, in order to tailor management of the contact information to particular needs/desires of the user, for instance.

At 706, a user can be queried to determine whether such user desires the contact information to be re-downloaded into active memory (e.g., a contact list or address phone book, etc.) on the mobile device. The query can also indicate, for instance, that a temporal condition, established by the user or initiated by default, has occurred. At 708, method 700 can receive a request to retrieve archived contact information. Such request can be independent of occurrence of the condition, for instance, and can provide authorization to override the temporal condition for archiving the contact information. Accordingly, method 700 can also provide for user-initiated un-archiving (and, e.g., archiving). At 710, the contact information can be received from the archive. At 712, the contact information can be displayed at the mobile device, optionally with an indication that such information has been retrieved from the archive as a result of a condition or as a result of a request by a user, as suitable.

Figure 8:
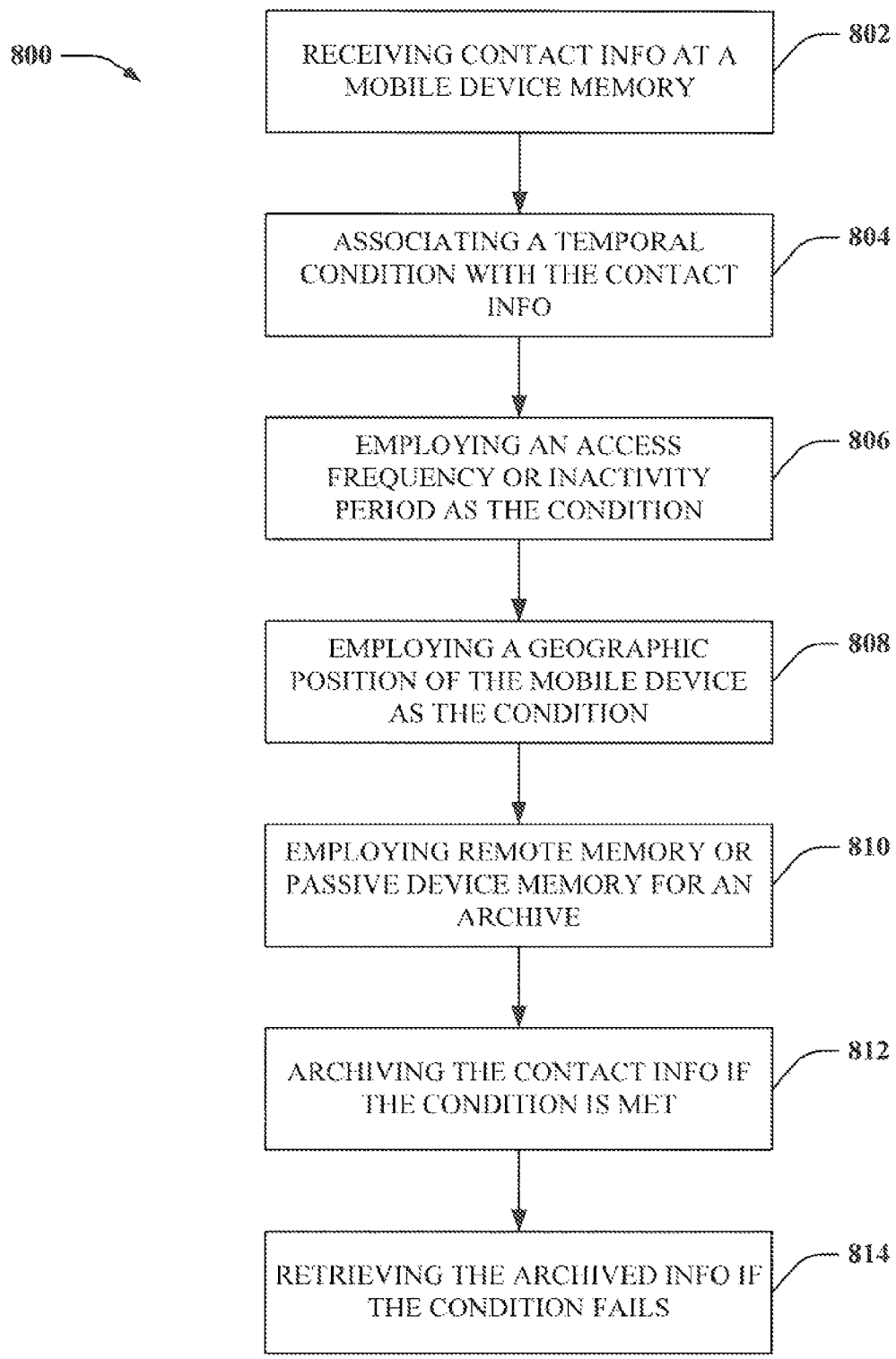
FIG. 8 illustrates a sample methodology for employing various temporal conditions for archiving mobile device contact information, according to one aspect.

FIG. 8 illustrates a sample methodology 800 for employing various temporal conditions for archiving mobile device contact information. At 802, contact information can be received at a mobile device memory as described herein. In addition, the contact information can be stored in an active contact list or address book application of the mobile device. At 804, a temporal condition can be associated with the contact information. At 806, an access frequency or inactivity period, or both, can be employed as the temporal condition. At 808, a geographic location can be employed as the temporal condition, either alternatively or in addition to the access frequency and/or inactivity period. The geographic location can be, for instance, a contemporaneous location of the mobile device as compared with a location and/or region pertinent to the contact information or an associated entity. At 810, remote memory or passive mobile device memory can be employed as an information archive. The remote memory can be coupled with the mobile device by way of a wired or wireless communication structure or architecture. The passive memory can include compressed memory local to the mobile device, that optionally is not included in a contact list or contact management application, or accessible via such list or application through an archive section that references the passive memory. At 812, the contact information is stored in the information archive if the temporal condition is met. Additionally, such contact information can be removed (e.g., deleted) from the contact list or address book application. At 814, the archived contact information can be retrieve from the archive and re-written to the contact list or address book application of the mobile device if the temporal condition fails.

Figure 9:
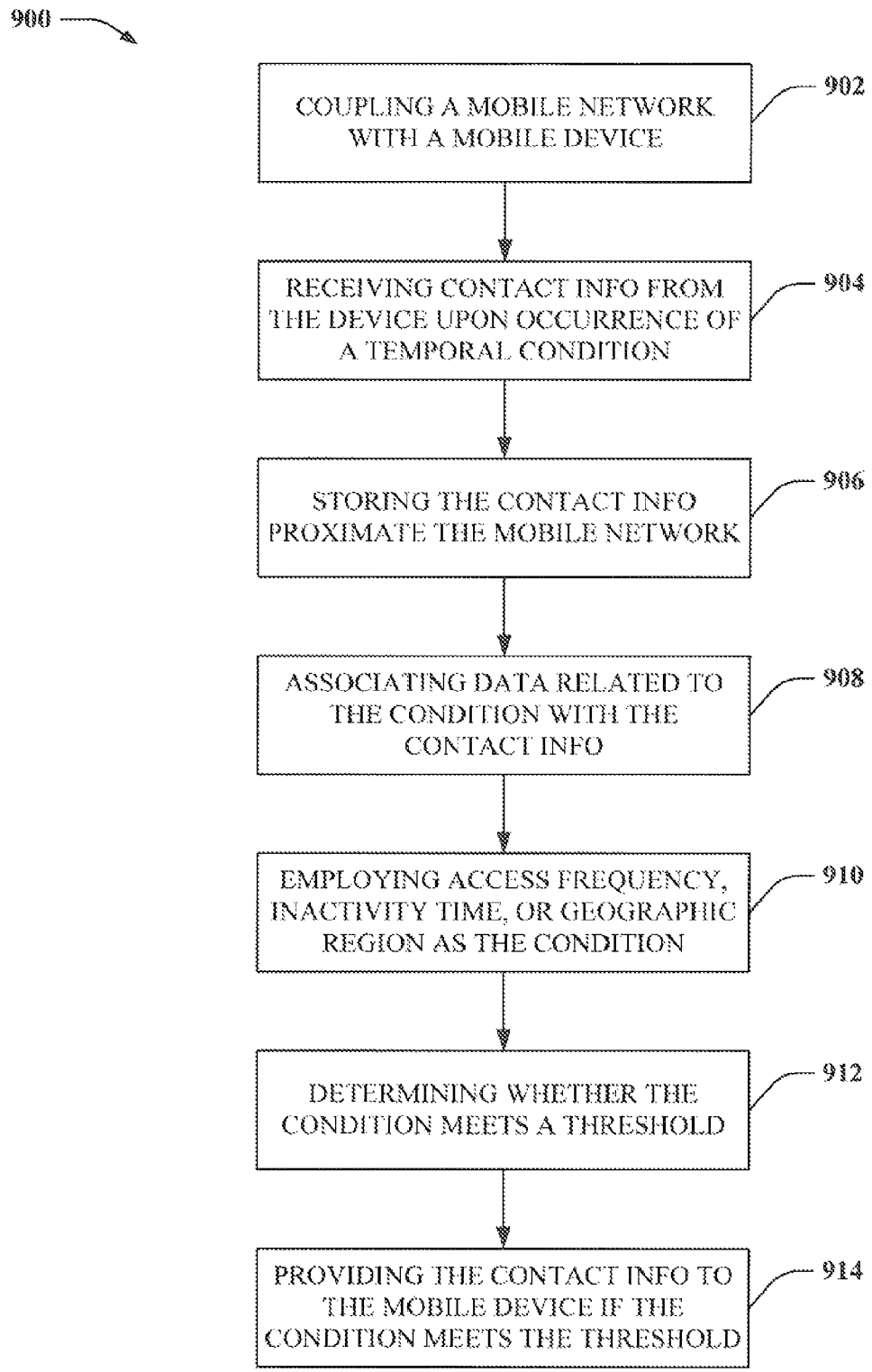
FIG. 9 depicts a sample methodology for interfacing with a mobile device to remotely store and/or retrieve contact information upon occurrence of a temporal condition, according to one aspect.

FIG. 9 depicts a sample methodology 900 for interfacing with a mobile device to remotely store and/or retrieve contact information upon occurrence of a temporal condition. At 902, method 900 can couple a mobile network with a mobile device, as described herein or known in the art. At 904, contact information can be received from the device upon occurrence of a temporal condition. At 906, the contact information can be stored proximate the mobile network. For instance, the contact information can be stored in a data store coupled to the mobile network.

At 908, data related to the temporal condition can be associated with the contact information. For example, the data can include a location pertinent to the contact information, as described herein. Such location can be compared with a concurrent location of the mobile device in relation to the temporal condition. Thus, as the mobile device moves from one location to another, the concurrent location can be updated and compared with the location pertinent to the contact information. If the locations match, the temporal condition can be assumed to be met (if, e.g., no other necessary condition applies). So long as the locations do not match, the temporal condition can be assumed to be un-met (if, e.g., no other alternative condition applies).

At 910, access frequency, inactivity time and/or geographic location are employed as the temporal condition, as described herein. At 912, a determination can be made as to whether the temporal condition meets a threshold. The threshold can be a particular access frequency (e.g., once per week), period of inactivity (e.g., one month) and/or proximity between device location and location pertinent to the contact information (e.g., 20 miles), or a combination thereof or of the like. At 914, the contact information can be provided to the mobile device if the threshold is met at reference number 912. As described, method 900 provides supporting and facilitating remote storage of mobile device contact information at mobile network data store. In addition, the method 900 provides a mechanism for a user to condition re-downloading the contact information to device memory based on occurrence of a condition, for instance, that is specified by the user or established in a default. Accordingly, method 900 provides for automatic archiving and retrieval of mobile device contact information to improve efficiency and reduce information clutter on such device(s).

Figure 10:
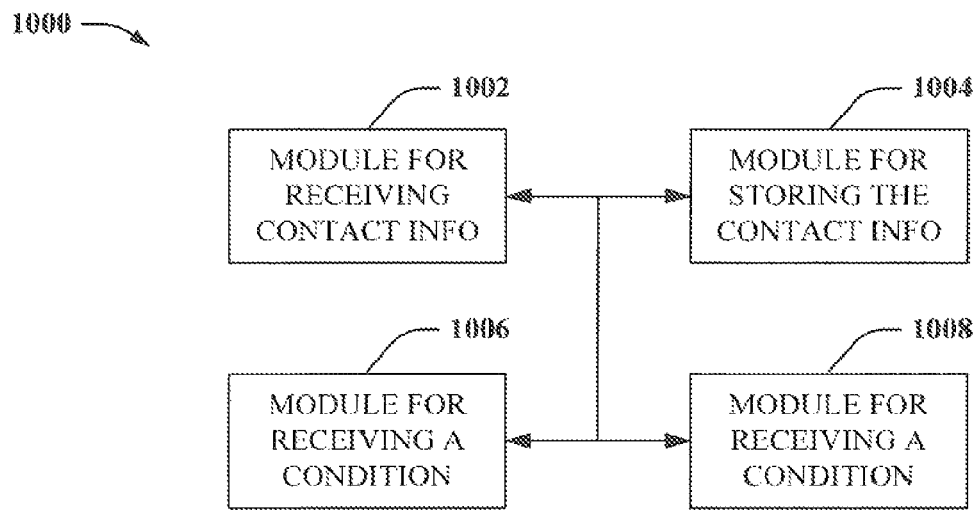
FIGS. 10 and 11 depict example block diagrams of apparatus modules that provide temporally limited mobile device contact information according to some aspects.
Figure 11:
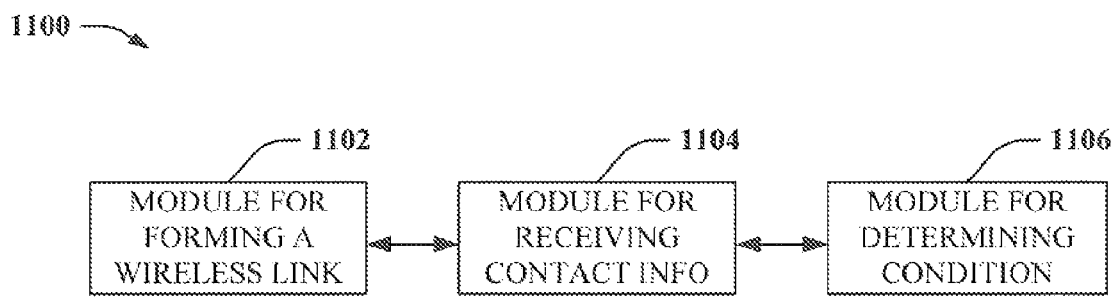

FIGS. 10 and 11 provide block diagrams of sample systems (1000, 1100) in accordance with particular aspects of the claimed subject matter. Specifically, system 1000 can provide for management of temporally limited contact information at a mobile device as described herein. System 1000 can include a module for receiving contact information 1002 at a mobile device. The module 1002 can include an antenna and/or receiver suitable for wired and/or wireless communication. Further, the contact information can pertain to any suitable person, business and/or organization, as described herein. Additionally, system 1000 can include a module for storing the contact information 1004 that stores such information in a contact list at the mobile device. The contact list can be an active list that is displayed by the mobile device upon activating and/or referencing a contact management application, address book, task list, calendar application, or the like.

System 1000 can further include a module for receiving or generating a temporal condition 1006. Specifically, the temporal condition can be pertinent to maintaining the contact information within the contact list of the mobile device based on a situational context of such device or use of the contact information, or both, as described herein. Also included, can be a module for removing the contact information 1008 from the contact list based at least in part upon occurrence of the temporal condition. Accordingly, system 1000 can manage contact information of a mobile device to provide an efficient and navigable contact list.

System 1100 can provide for interfacing and supporting temporally limited mobile contact information from a mobile network, for instance. Particularly, system 1100 can include a module for communicatively coupling 1102 the mobile network with a mobile device. Such mobile device can include a contact list with at least one contact limited to a temporal condition, as described herein. Furthermore, system 1100 can include a module for receiving contact information of an entity (e.g., at a data store coupled to the mobile network) 1104. The module 1104 can receive the contact information from the mobile device upon occurrence of a temporal condition limiting storage of the contact information at memory proximate the mobile device. Satisfying the condition can result in removing the contact information from active memory on the mobile device (or, e.g., moving the contact information into passive memory at such device) and, for instance, onto remote memory coupled to the mobile network. Accordingly, system 1100 describes a mechanism for remotely archiving mobile device contact information based at least in part upon occurrence of a specified and/or default temporal condition.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of temporally limiting contact information of an entity stored within a mobile communication device, comprising:
   receiving the contact information of the entity at the mobile communication device;
   storing the contact information in a contact list at the mobile communication device; and
   receiving or generating a temporal condition for maintaining the contact information in the contact list.

2. The method of claim 1, further comprising:
   removing the contact information from the contact list based at least in part upon an occurrence of the temporal condition.

3. The method of claim 2, further comprising archiving the contact information upon removal from the contact list by storing the contact information in passive memory or remote memory, or in the passive memory and in the remote memory.

4. The method of claim 3, further comprising:
   conditioning the archiving and the removing on receiving user approval;
   prompting for the user approval upon the occurrence of the temporal condition; and
   archiving the contact information and/or removing the contact information from the contact list based on approval being received.

5. The method of claim 3, further comprising:
   receiving a request to archive the contact information and remove the contact information from the contact list; and
   overriding the temporal condition to archive the contact information prior to the occurrence of the temporal condition.

6. The method of claim 3, further comprising at least one of:
   receiving a recall request for the contact information;
   receiving the contact information from the passive memory or the remote memory; or
   providing archived contact information to a user of the mobile communication device.

7. The method of claim 3, further comprising at least one of:
   employing a remote server or a personal computer (PC) as the remote memory; and
   employing compressed mobile device memory as the passive memory.

8. The method of claim 3, further comprising retrieving the contact information from the passive memory or the remote memory when the mobile communication device enters a predetermined geographical region associated with the contact information.

9. The method of claim 3, further comprising re-storing the contact information in the contact list when access to the contact information rises above a threshold access frequency or when the contact information is accessed within a threshold period of time, or when the contact information rises above the threshold access frequency and the contact information is accessed within the threshold period of time.

10. The method of claim 1, further comprising at least one of:
    employing a geographical region as the temporal condition, wherein an occurrence of the temporal condition results when the mobile communication device travels outside of the geographical region;
    employing a threshold inactive period as the temporal condition, wherein the occurrence of the temporal condition results when the contact information is not accessed by a user of the mobile communication device for the threshold inactive period; or
    employing a threshold access frequency as the temporal condition, wherein the occurrence of the temporal condition results when access to the contact information drops below the threshold access frequency.

11. The method of claim 1, further comprising employing a default temporal condition as the generated temporal condition, wherein the default temporal condition includes a predetermined access frequency, or a proximity to a predetermined geographical region, or a predetermined non-access time, or a combination thereof.

12. The method of claim 1, further comprising deleting the contact information from mobile communication device memory upon an occurrence of the temporal condition.

13. An apparatus that provides temporary storage of contact information of an entity for a mobile device, comprising:
    an interface that receives the contact information of the entity at the mobile device;
    memory that stores the contact information and at least a contact management module that is configured to receive or generate a temporal condition for retaining the contact information within the memory; and a processor that executes at least the contact management module to associate the temporal condition with the contact information.

14. The apparatus of claim 13, wherein the memory further comprises an archive module that is configured to remove the contact information from the memory based at least in part upon an occurrence of the temporal condition.

15. The apparatus of claim 14, wherein the archive module writes the contact information to a passive memory, or a remote memory, or to the passive memory and the remote memory, upon removal from the memory.

16. The apparatus of claim 15, wherein:
the archive module is further configured to condition removal of the contact information on reception of user approval;
the interface prompts for the user approval upon the occurrence of the temporal condition; and
the archive module writes the contact information to the passive memory or the remote memory, or to the passive memory and the remote memory, based on the user approval being received.

17. The apparatus of claim 15, wherein:
the interface receives a request to archive the contact information and remove the contact information from a contact list; and
the archive module is configured to override the temporal condition and remove the contact information prior to the occurrence of the temporal condition.

18. The apparatus of claim 15, wherein at least one of:
the interface receives a recall request for the contact information;
the archive module retrieves the contact information from the passive memory or the remote memory; or
the interface provides archived contact information to a user of the mobile device.

19. The apparatus of claim 15, wherein at least one of:
the remote memory is associated with a remote server or a personal computer (PC), or the remote server and the PC; or
the passive memory is a compressed memory at the mobile device.

20. The apparatus of claim 15, wherein the archive module is configured to retrieve the contact information from the passive memory or the remote memory when the mobile device enters a predetermined geographical region.

21. The apparatus of claim 15, wherein the archive module is configured to re-store the contact information in the memory when access to the contact information rises above a threshold access frequency or when the contact information is accessed within a threshold period of time, or when the contact information rises above the threshold access frequency and the contact information is accessed within the threshold period of time.

22. The apparatus of claim 13, wherein at least one of:
the temporal condition is a geographical region such that an occurrence of the temporal condition results when the mobile device travels outside of the geographical region;
the temporal condition is a threshold inactive period such that the occurrence of the temporal condition results when the contact information is not accessed by a user of the mobile device for the threshold inactive period; or
the temporal condition is a threshold access frequency such that the occurrence of the temporal condition results when access to the contact information drops below the threshold access frequency.

23. The apparatus of claim 13, wherein the generated temporal condition is a default temporal condition that includes a predetermined access frequency, or a proximity to a predetermined geographical region, or a predetermined non-access time, or a combination thereof.

24. The apparatus of claim 13, wherein an archive module deletes the contact information from the memory upon an occurrence of the temporal condition.

25. An apparatus that provides temporally limited contact information of an entity for a mobile device, comprising:
means for receiving the contact information of the entity at the mobile device;
means for storing the contact information in a contact list at the mobile device; and
means for receiving or generating a temporal condition for maintaining the contact information in the contact list.

26. A non-transitory computer-readable medium containing instructions for providing temporally limited contact information of an entity for a mobile device, comprising:
at least one instruction for receiving contact information of the entity at the mobile device;
at least one instruction for storing the contact information in a contact list at the mobile device; and
at least one instruction for receiving or generating a temporal condition for maintaining the contact information in the contact list.

* * * * *